Feb. 18, 1930.  J. T. TRAVERS  1,747,803
PROCESS AND APPARATUS FOR THE PURIFICATION OF POLLUTED LIQUIDS
Filed Aug. 19, 1927    2 Sheets-Sheet 1
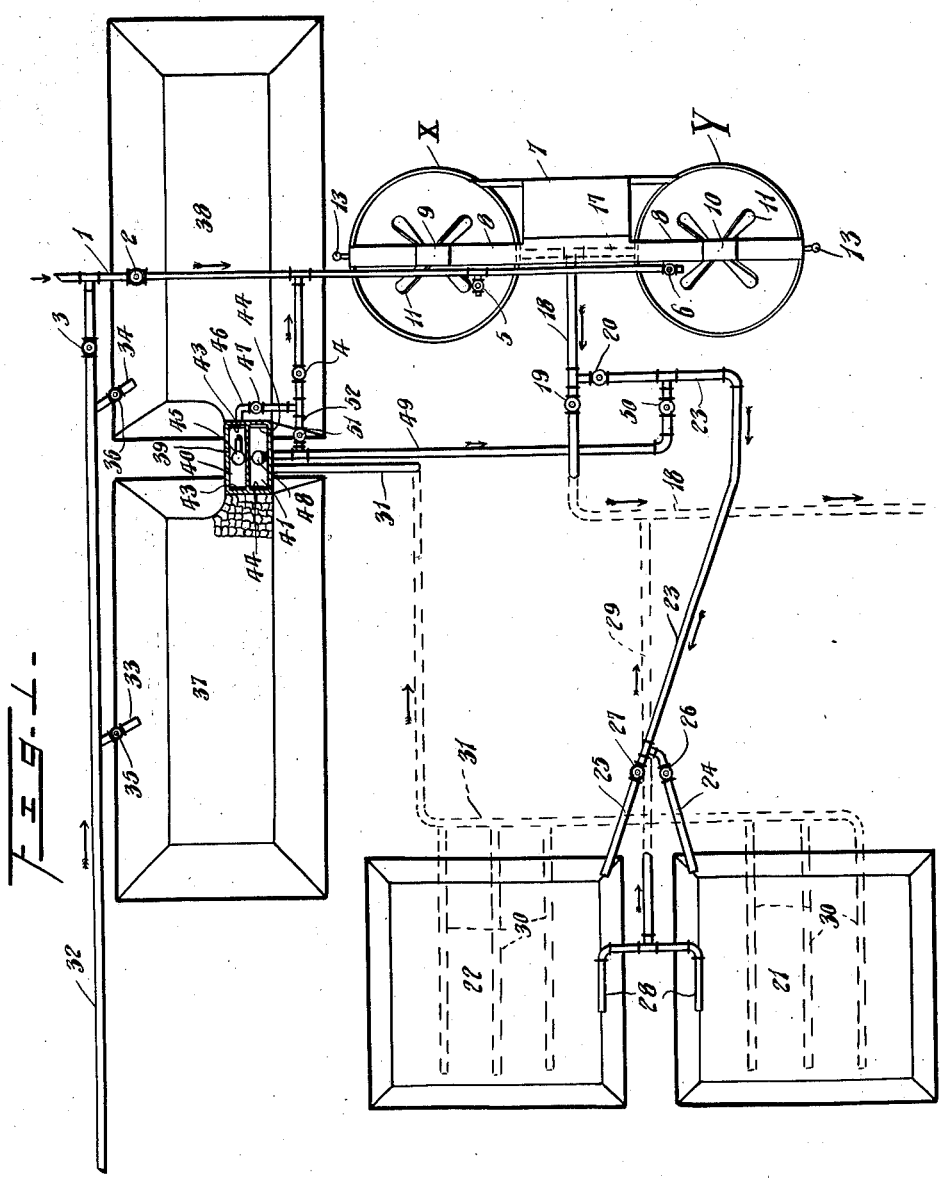
Inventor
John T. Travers.
By James P. Burns
Attorney

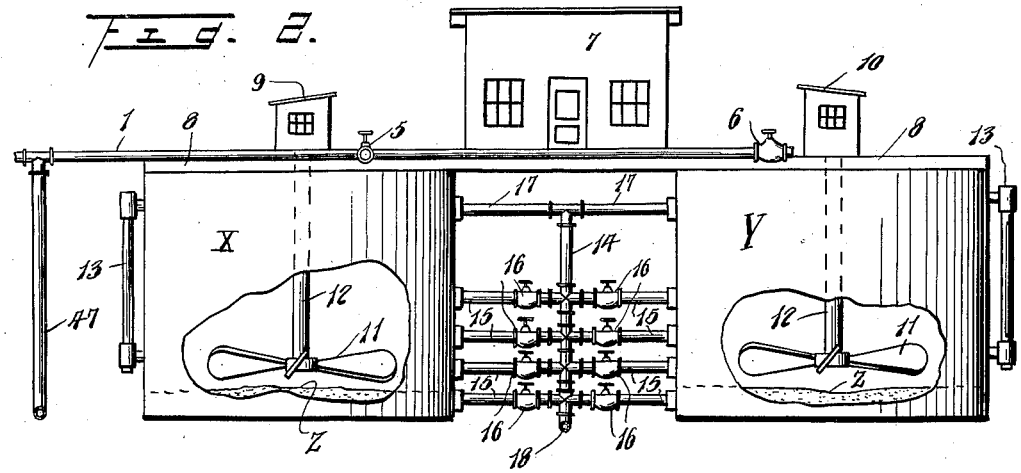
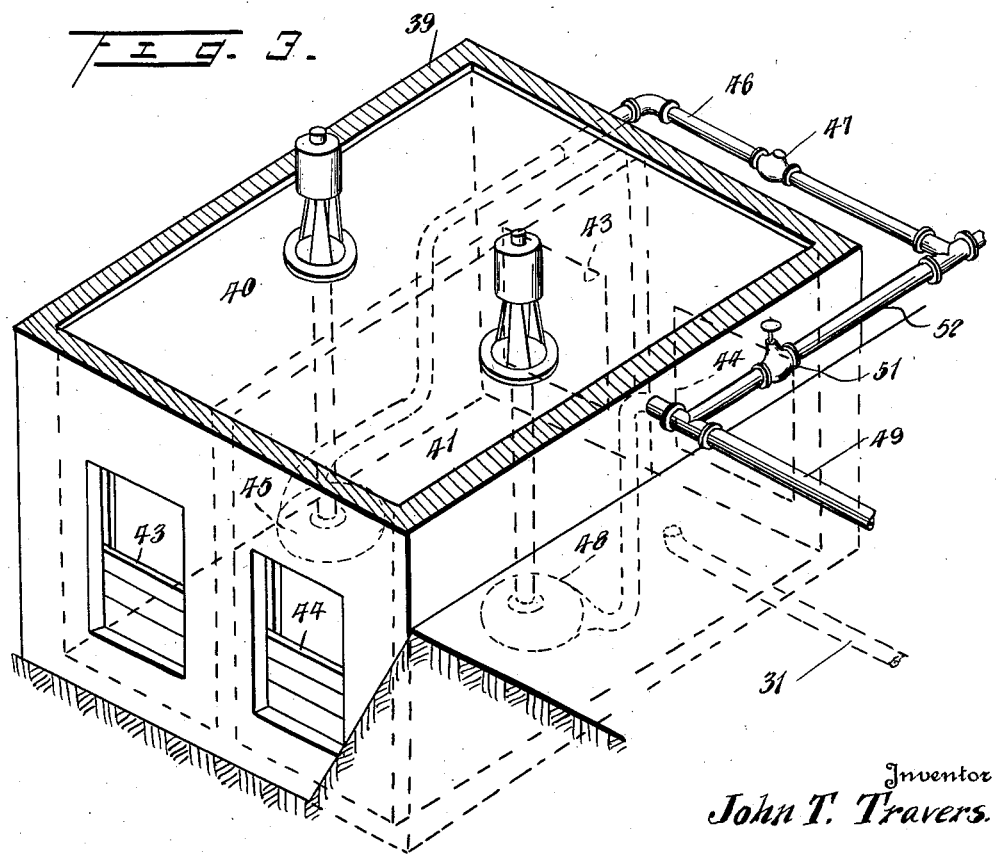

Patented Feb. 18, 1930

1,747,803

UNITED STATES PATENT OFFICE

JOHN T. TRAVERS, OF COLUMBUS, OHIO, ASSIGNOR, BY DIRECT AND MESNE ASSIGNMENTS, TO THE OHIO SANITARY ENGINEERING CORPORATION, OF COLUMBUS, OHIO, A CORPORATION OF OHIO

PROCESS AND APPARATUS FOR THE PURIFICATION OF POLLUTED LIQUIDS

Application filed August 19, 1927. Serial No. 214,071.

This invention relates to an improved process and apparatus for treating polluted liquids such as sewage and industrial waste. The invention relates to a process and apparatus for treating polluted liquids with suitable reagents to separate the putrescible matter therefrom and is not concerned with processes based upon the assumption that bacteria in the sewage multiply and consume the organic matter.

Heretofore in processes wherein the organic matter content of a polluted liquid has been precipitated and coagulated by the introduction of treating agents, the operation has usually been effected in a large tank or zone while the liquid continuously flows through such zone. In such operations it is impossible to obtain uniform conditions of operation with uniform results because of the constant changing of the liquid under treatment. Furthermore in these known operations, extreme care is necessitated in the control over the admission of liquid to the treating zone, its discharge therefrom, and the velocity of flow necessitating expensive installations and the employment of hydraulics.

This invention specifically contemplates the provision of a process and apparatus for the continuous treatment of polluted liquids in which uniform conditions of operation may be maintained and fixed and known results obtained without the use of hydraulics and other expensive installations. These results are obtained in accordance with my invention by treating a fixed quantity of liquid with a definite amount of a suitable treating mixture, agitating the liquid for a predetermined time period and allowing a fixed detention period for precipitation, coagulation and settling of the putrescible matter from the liquid, followed by rapid and free release of the purified effluent.

A more specific aspect of the invention contemplates the repeated contacting of the treating reagent with the liquid and the provision of means for accomplishing this result.

The chemical process involved is largely based upon an appreciation of the fact that a very substantial portion of the putrescible matter as well as the bacteria in polluted liquids are present in a colloidal state. The process accordingly effects an elimination or separation of the colloids from the liquid. The character of the reagent employed in my process is responsible for this function. I have ascertained that the colloids present in polluted liquids carry an electrical charge; that they are negatively charged when the liquid has an alkaline reaction and positively charged when it has an acid reaction. Further I find that the charge of the colloids may be neutralized when negative by the addition to the liquid of an electrolyte producing material in the form of an ionizable metallic salt which dissociates, releasing positive ions which are adsorbed by the negative colloids, neutralizing the electrical charges thereof and transforming them into suspensoids which are readily coagulated and settled out by any suitable coagulant.

The process will be described in connection with a preferred embodiment of my apparatus shown in the accompanying drawings wherein:—

Figure 1 is a plan view of my improved apparatus for carrying out my process;

Fig. 2 is a side elevational view with parts in section, taken on the line 2—2 of Figure 1;

Fig. 3 is a detailed perspective view of a portion of the apparatus which may or may not be used.

In the treatment of some industrial waste containing a high percentage of suspensoids such, for example, as sulphite pulp mill waste liquors and waste liquors discharged from tanneries, it is preferable to provide a preliminary settling period or treatment to effect precipitation of a substantial portion of the suspensoids prior to the treatment with the principal chemical reagent employed in my process. Other polluted liquids such as creamery waste and domestic sewage do not require a preliminary settling period or treatment since such liquids contain only a small per cent of suspensoids which will precipitate on settling. My improved process and apparatus is adapted to be employed for the treatment of any industrial waste containing putrescible matter in suspension and in colloidal form.

When treating a polluted liquid, the putrescible content of which is largely present in colloidal form and which normally contains but a small per cent of suspensoids capable of precipitation on standing, the polluted liquid is at once subjected to treatment with the chemical reagent in my process. Referring to Figure 1, such a polluted liquid flows from its source and is delivered through the line 1 controlled by the valve 2, valves 3 and 4 being closed, to one of the alternate treating tanks X and Y. The admission of the polluted liquid to tanks X and Y is controlled by suitable valves 5 and 6. The arrangement is such that when valve 5 is open and valve 6 closed, liquid will be delivered to tank X and when valve 6 is open and valve 5 closed, liquid will be delivered to tank Y. In the normal operation of the process the treating tanks are used alternately. When liquid is being treated in one tank, a new supply is being introduced to the other tank. While I have here illustrated but two tanks, it will be understood that any desired number of tanks may be employed and operated in suitable rotation or certain or all of the tanks may be operated in parallel.

Above and intermediate the tanks X and Y is located a chemical storage house 7. A runway 8 leads from the storage house 7 to the hopper houses 9 and 10 positioned above the tanks X and Y respectively. A suitable hopper (not shown) is positioned in each of the hopper houses 9 and 10 for permitting the introduction of treating agents into the polluted liquid undergoing treatment in the tanks.

Each tank is equipped with an agitator 11 driven from a motor (not shown) through the medium of a shaft 12. The blades of the agitators 11 are so set as to effect an upward circulation within the treating tanks for a purpose to be hereinafter described. Each tank is provided with a liquid level gauge 13 through the medium of which the quantity and character of the liquid in the tanks can be readily ascertained.

In carrying out the process, a predetermined volume of the polluted liquid to be treated is introduced to one of the tanks and the supply of liquid to such tank is then discontinued. The putrescible colloids are not in suspension or solution but they are in dispersion in the liquid and remain so as long as their stability is not destroyed. By destroying the stability of the colloids they are transformed from colloids into suspensoids and pass from a state of dispersion into one of suspension and can thereafter be readily coagulated. As heretofore stated, in an alkaline solution the colloids carry a negative charge. By supplying to the liquid a suitable ionizable substance as, for example, $CaSO_4$ the same will dissociate, releasing an excess of positive Ca ions. The charges of the negative colloids are neutralized to the isoelectric point by the adsorption of the positive ions released upon dissociation of the ionizable substance which produces an electrolyte. The stability of the colloids is thus destroyed and precipitation then takes place.

I have found that accompanying the adsorption of the positive ions of the electrolyte by the colloids there occurs a release of nascent oxygen caused by the action of the released negative ions of the electrolyte on the water solution as, for instance, when calcium sulphate is used to produce the electrolyte, the $SO_4$ ion unites with the water solution as follows:—

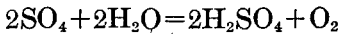
$$2SO_4 + 2H_2O = 2H_2SO_4 + O_2$$

The amount of nascent oxygen produced is found to be in proportion to the amount of colloids in the sewage or industrial waste undergoing treatment. This I find to be due to a greater adsorption of the positive ions by the colloids, there being a larger amount of negative ions released for reaction with the water solution. This nascent oxygen assists in the destruction of bacteria and also supplies the effluent with a quantity of dissolved oxygen, thus eliminating any necessity of re-aeration.

The treating mixture employed in the process must, therefore, contain constituents which will produce an alkaline reaction in the polluted liquid, supply an ionizable electrolyte producing substance thereto, and effect a coagulation of the suspensoids formed.

I preferably employ hydrated lime as the constituent of the mixture adapted to effect an alkaline reaction in the liquid. There are a number of strong base-forming substances which are capable of ionization in the solution to produce an electrolyte and supply an excess of positive ions for adsorption by the negatively charged colloids. Such substances include calcium sulphate, magnesium sulphate, waste dust collected from the precipitators in the manufacture of cement having a substantial content of calcium carbonate and a pulverized solid waste material recovered from waste liquors discharged from alkali plants in the manufacture of chlorine, chloride of lime, and caustic soda. The last two substances constitute waste products from two important industries which I am able to economically utilize in my process. There are also several materials which may be incorporated in my treating mixture to supply the coagulating constituent thereof. Such materials are, for example, ferrous sulphate, aluminum sulphate, and calcium monophosphate.

From the foregoing, it is evident that my treating mixture includes three main ingredients: (a) an alkali, (b) an electrolyte producing material and (c) a coagulant. In the treating mixture the electrolyte producing material always predominates. For example, a standard mixture will always comprise 100 parts, of which in excess of 50 parts will always represent electrolyte producing material. The electrolyte producing material may, however, vary from 50 parts to 85 parts of the mixture. The other ingredients, namely, the alkali and coagulant will vary dependent upon the quantity of electrolyte producing material employed but will always be used in proportions to give a mixture comprising 100 parts. The quantity of the alkali employed will, to some extent, be governed by the acidity of the polluted liquid under treatment and will always be sufficient to effect an alkaline reaction therein. The quantity of the treating mixture best adapted for treatment of a given polluted liquid may be ascertained by making a few trial tests, noting the rapidity of precipitation, the size of the floc, and the clarification of the liquid. Generally speaking, the more concentrated the polluted liquid treated, the greater quantity of treating mixture required. For example, in treating domestic sewage which is a relatively dilute waste, a quantity of from 3 to 7 pounds of the treating mixture will be found satisfactory while in the treatment of a highly concentrated waste like cannery waste, a quantity of from 100 to 125 pounds of the treating mixture may be found to give the best results, these amounts being for each 1000 gallons of liquid waste treated.

Returning now to the operation of the apparatus, a known quantity of liquid is introduced to tank X, the proper quantity of the treating mixture is then introduced to the liquid and the agitator 11 set in motion. The period of agitation will depend on the volume of liquid treated, the size of the agitator, etc. I find, however, that a period of from 3 to 7 minutes is normally sufficient. The agitation is then ceased and a settling or clarification period allowed within which the precipitated suspensoids coagulate and settle out. A settling period of 30 minutes is adequate to effect clarification of the liquid.

The effluent clarified in tanks X and Y is non-putrescible and may be directly discharged into a receiving stream. To facilitate the removal of the effluent from the tanks X and Y there is provided a common header 14 connected to each tank through a plurality of vertically spaced draw-off lines 15, each having a valve 16. The purpose of these vertically spaced draw-off lines is to permit the clarified effluent to be gradually removed from the treating tanks from the top toward the bottom thereof. It will be understood that the upper strata or layer of the effluent is the first to be clarified. By employing the vertically spaced draw-off lines 14, the clarified layers may be removed from the top of the tanks while settling and clarification is still in progress near the bottom of the tanks, thus facilitating the operation of the process. The lower draw-off line from each tank X and Y is adapted to be employed for the removal of sludge from the tanks in a manner to be presently described. It will also be noted that an overflow line 17 connects each tank with the header 14 at a point at which it is desired to maintain the liquid level in the tanks.

The common header 14 communicates with a discharge line 18 through which clarified effluent is passed to the receiving stream when valve 19 is open and valve 20 closed. An accumulation of sludge Z is indicated in each of tanks X and Y. This sludge comprises the material separated from the polluted liquid treated in the tanks and all undissolved portions of the treating mixture employed in the process.

The electrolyte producing material of the mixture is of a reatively slowly soluble character and much of it settles without dissociation and accumulates with the sludge in the bottom of the tanks. To make available this electrolyte producing material in the treatment of subsequent batches of liquid, is one of the functions of the agitators 11. These agitators as above stated, effect an upward circulation in the tanks. They thereby redistribute a substantial portion of the accumulated sludge through the liquid during the period of agitation. This redistribution not only causes additional portions of the electrolyte producing material to dissolve but also creates a sweeping effect, the redistributed sludge constituting a type of floating filter which in settling accumulates and carries down substances in suspension and partial solution. This phase of the operation renders my process very economical as it will be noted that in the treatment of each batch of liquid in the tanks X and Y a quantity of treating mixture need only be added which will replace the content of the mixture dissolved in the preceding treatment. It will be understood that the sludge is only removed from the tanks at relatively long intervals as, for example, every two or three weeks.

When it is desired to remove sludge from either of the treating tanks X or Y all communications between said tanks and the header 14 are closed except the bottom draw-off line 15 communicating with the tank from which the sludge is to be removed. The sludge may then be delivered to the dewatering beds 21 and 22 by closing the valve 19 in line 18 and opening the valve 20, the sludge passing through the line 23 and selectively through branch lines 24 and 25 controlled by valves 26 and 27. Should the sludge fail for any reason to flow from the tanks X and Y it may be forced from said tanks by placing a hydrostatic head pressure thereon. This may be accomplished by either admitting liquid to the tank from which the sludge is being withdrawn or by opening one of the connecting lines 15 communicating with the alternate tank whereby liquid from the alternate tank is forced under hydrostatic head pressure into header 14 and flushes out the sludge line carrying the sludge with it to the dewatering beds 21 and 22.

Clarified water which accumulates above the sludge in the dewatering beds may be decanted off via the top drain branch lines 28 and passed through line 29 to the effluent discharge line 18 and thence to the receiving stream. The sludge beds 21 and 22 are of more or less conventional design, each being provided with a plurality of underdrain laterals 30, all of which communicate with the common underdrain line 31. The underdrain liquor is frequently discolored and incompletely clarified. Accordingly the same may be, if desired, subjected to retreatment.

When treating a polluted liquid of the class containing a high per cent of suspended solids, the liquid instead of being supplied to the apparatus through the line 1, may be fed through line 32, the valve 3 being closed, and selectively directed through branch lines 33 and 34 controlled by valves 35 and 36 and thus delivered into either of the alternate settling zones 37 and 38. The liquid is permitted to assume a quiescent state in one of the settling zones 37 and 38 to allow suspended solids to settle therefrom while additional liquid is being introduced to the other settling zone. If desired, the polluted liquid may be given a preliminary treatment in the settling zones 37 and 38 to accelerate separation of suspensoids from the liquid therein as well as to effect partial clarification thereof.

To effect the removal of the still polluted liquid, from which substantial portions of the suspended matter has settled, from the settling zones 37 and 38, I provide a pump well or house 39 positioned intermediate the zones 37 and 38. The pump well 39 has two compartments, a polluted liquid compartment 40 and a sludge compartment 41, each of which communicates with either settling zone 37 or 38. The compartment 40 has sluice gates 43 for selectively placing that compartment in communication with the settling zones, while compartment 41 has similar sulice gates 44 (shown in detail in Figure 3). From the polluted liquid compartment 40, the liquid is forced by a suitable pump 45, through the line 46 and check valve 47 to either of the alternate treating tanks X and Y, the valve 4 being open and the valve 2 being closed, the liquid being thereafter treated in the tanks X and Y in the precise manner hereinbefore described for treatment of liquid introduced directly to these tanks through the line 1.

The sludge representing the suspended matter precipitated from the liquid in the settling zones 37 and 38 may be removed periodically as, for example, every few weeks. To accomplish this, the sluice gate 44 opening into the settling zone from which sludge is to be removed, is opened and the sludge passed into sludge compartment 41 of the pump well 39. From compartment 41, the sludge is forced by the sludge pump 48 through the sludge line 49, valve 50, combined sludge line 23 and alternately discharged into sludge dewatering beds 21 and 22 through the branch sludge lines 24 and 25. Should the sludge lines 49 and 23 become clogged during removal of sludge from settling zones 37 and 38, these lines may be flushed out by liquid forced through the pump 45. This is accomplished by closing the valve 4 and opening the valve 51 in the cross line 52.

As heretofore stated, it is possible in my process to retreat the underdrain liquor removed from the sludge dewatering beds 21 and 22. This is done by passing this liquor through the line 31 to the sludge compartment 41 of pump well 39. This underdrain liquor may accumulate in compartment 41 and be thence passed by sludge pump 48 to either of the treating tanks X and Y for treatment therein. This is done by closing the valve 50 and opening the valve 51 in the cross line 52. This method of returning the underdrain liquor from dewatering beds 21 and 22 may be employed when the polluted liquid undergoing treatment in the process is introduced through the line 1 as well as when introduced through line 32.

It will be understood that in some installations the settling zones 37 and 38 and associated parts may be entirely eliminated. In such event any suitable means may be provided for returning underdrain liquor from line 31 to the treating tanks X and Y.

By the use of the treating tanks as above set forth, I am enabled to treat polluted liquids in a most economic manner with utter disregard for hydraulics and expensive flow control equipment. The alternate employment of the treating tanks permits the treatment of a continuous flow of polluted liquid under known conditions. A fixed volume of the liquid is isolated in a treating tank and there reacted on with the precise quantity of treating mixture suited for such volume of liquid and treated without changing conditions for a properly controlled time period. By such an operation, uniform and known results are always obtainable.

To establish the effectiveness and operation of the process, the following illustrative treatment of domestic sewage is given.

The sewage treated showed upon analysis:—

| | | |
|---|---|---|
| Total solids | 1663 | P.P.M. |
| Total organic matter | 497 | P.P.M. |
| Suspended matter | 994 | P.P.M. |
| Organic suspended matter | 302 | P.P.M. |
| Organic nitrogen | 16.0 | P.P.M. |
| Albuminoid nitrogen | 4.0 | P.P.M. |
| Dissolved oxygen | .2 | P.P.M. |
| 10 days biochemical oxygen demand at 20° C. | (412) | |
| Total bacteria | 1,700,000 | per c. c. |
| B. coli | 290,000 | per c. c. |

When treated in accordance with my process, by being directly introduced to the treating tanks and reacted on with from 3 to 7 pounds of treating mixture per 1,000 gallons of liquid treated, said mixture embodying 80 parts waste dust from precipitators used in cement manufacture, 10 parts of ferrous sulphate and 10 parts of hydrated lime, agitating for four minutes and allowing a 30 minute settling period, an effluent was produced which showed upon analysis:—

| | | |
|---|---|---|
| Total solids | 850 | P.P.M. |
| Total organic matter | 70 | P.P.M. |
| Suspended matter | 8 | P.P.M. |
| Organic suspended matter | 5 | P.P.M. |
| Organic nitrogen | 4.0 | P.P.M. |
| Albuminoid nitrogen | 1.2 | P.P.M. |
| 10 days biochemical oxygen demand at 20° C. | 24 | P.P.M. |
| Total bacteria | 800 | per c. c. |
| B. coli | 8 | per c. c. |

The description herein contained is only illustrative and it is to be understood that my invention comprehends within its scope such changes and modifications as may be necessary to adapt the same to use under varying existing conditions Having described my invention, what I claim is:—

1. A process for treating a polluted liquid containing colloids comprising introducing a quantity of the liquid to an enlarged treating zone, introducing to the liquid in said treating zone a reagent characterized by its slow solubility and its ability to transform colloids present in the liquid into suspensoids and subsequently coagulate the suspensoids so formed, agitating the liquid in said treating zone at a point adjacent the bottom of said treating zone, effecting repeated contact of undissolved portions of the reagent which have settled in the treating zone with the liquid, subsequently maintaining the liquid in a quiescent state in the treating zone for a period sufficient to allow the suspensoids to settle out, and thereafter removing the liquid substantially free from suspensoids from said treating zone.

2. An apparatus for treating polluted liquids comprising a primary settling zone, means for introducing polluted liquid to said settling zone, a treating zone, means for conveying liquid from said settling zone to said treating zone, a sludge bed, means for conveying sludge directly from said settling zone to said sludge bed, and means for conveying sludge directly from said treating zone to said sludge bed.

3. An apparatus for treating polluted liquids comprising a primary settling zone, means for introducing polluted liquid to said settling zone, a treating zone, means for conveying liquid from said settling zone to said treating zone, a sludge bed, means for conveying sludge from said settling zone to said sludge bed, means for conveying sludge from said treating zone to said sludge bed, and means for returning water separated from the sludge in said sludge bed to said treating zone.

4. An apparatus for treating polluted liquids comprising multiple settling chambers, multiple treating tanks, and multiple sludge beds, means for selectively supplying the polluted liquid either to one of said settling chambers or directly to one of said treating tanks, means for conveying sludge from said settling chambers to said sludge beds and means for conveying sludge from said treating tanks to said sludge beds, said sludge conveying means being constructed to permit selective use of said sludge beds.

5. An apparatus for treating polluted liquids comprising in combination a treating tank, a sludge bed, a conduit for conveying sludge from said tank to said sludge bed, and means for forcing water drained from the sludge in said sludge bed into said conduit to flush out the same.

6. An apparatus for treating polluted liquids comprising a settling chamber, a treating tank and sludge bed serially connected, means for by-passing said settling chamber and means for by-passing said treating tank.

JOHN T. TRAVERS.